(12) United States Patent
Ohkawa et al.

(10) Patent No.: US 7,940,984 B2
(45) Date of Patent: May 10, 2011

(54) IMAGE PROCESSING APPARATUS, IMAGE PROCESSING METHOD, AND COMPUTER PROGRAM PRODUCT

(75) Inventors: Satoshi Ohkawa, Tokyo (JP); Hiroyuki Kawamoto, Kanagawa (JP); Tomoyuki Yoshida, Tokyo (JP); Atsushi Togami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 988 days.

(21) Appl. No.: 11/819,069

(22) Filed: Jun. 25, 2007

(65) Prior Publication Data

US 2008/0008388 A1    Jan. 10, 2008

(30) Foreign Application Priority Data

Jul. 4, 2006   (JP) .................. 2006-184486

(51) Int. Cl.
   *G06K 9/00*   (2006.01)
(52) U.S. Cl. ...................................... 382/167
(58) Field of Classification Search .................. None
   See application file for complete search history.

(56) References Cited

U.S. PATENT DOCUMENTS

| | | | | |
|---|---|---|---|---|
| 5,933,257 A * | 8/1999 | Kurita | | 358/527 |
| 6,324,309 B1 * | 11/2001 | Tokuyama et al. | | 382/300 |
| 6,388,768 B2 * | 5/2002 | Hada et al. | | 358/1.9 |
| 6,636,630 B1 * | 10/2003 | Adachi et al. | | 382/176 |
| 6,903,844 B1 * | 6/2005 | Kamiya | | 358/2.1 |
| 7,061,647 B2 * | 6/2006 | Matsuya | | 358/1.9 |
| 2004/0125410 A1 * | 7/2004 | Shirata et al. | | 358/2.1 |

FOREIGN PATENT DOCUMENTS

| | | |
|---|---|---|
| JP | 06-054176 | 2/1994 |
| JP | 09-134438 | 5/1997 |
| JP | 10-042130 | 2/1998 |
| JP | 2000-333003 | 11/2000 |
| JP | 2001-223828 | 8/2001 |
| JP | 2001-251522 | 9/2001 |
| JP | 2003-186635 | 7/2003 |
| JP | 2004-112695 | 4/2004 |
| JP | 2004-282240 | 10/2004 |
| JP | 2006-041492 | 2/2006 |

OTHER PUBLICATIONS

Office Action dated Mar. 30, 2010 issued in corresponding Japanese Application No. 2006-184486.

* cited by examiner

*Primary Examiner* — Yuzhen Ge
(74) *Attorney, Agent, or Firm* — Harness, Dickey & Pierce, P.L.C.

(57) ABSTRACT

A determining unit extracts similar-characteristic areas in image data and determines a type of the characteristics of image data of each of the similar-characteristic areas, a first correcting unit corrects a characteristic of image data in each of the similar-characteristic areas to a predetermined data characteristic according to the type of the characteristics of image data of that similar-characteristic area thereby obtaining characteristics-corrected image data, a storage unit stores therein the image data and the characteristics-corrected image data, a second correcting unit corrects a characteristic of the image data and the characteristics-corrected image data stored in the storage unit to a destination-specific characteristic that corresponds to a destination to which image data is to be output, and an output unit outputs the image data having the destination-specific characteristic to the destination.

15 Claims, 4 Drawing Sheets

IMAGE PROCESSING APPARATUS, IMAGE
PROCESSING METHOD, AND COMPUTER
PROGRAM PRODUCT

CROSS-REFERENCE TO RELATED APPLICATIONS

The present document incorporates by reference the entire contents of Japanese priority document, 2006-184486 filed in Japan on Jul. 4, 2006.

BACKGROUND OF THE INVENTION

1. Field of the Invention

The present invention generally relates to a technology for processing images and outputting the processed images.

2. Description of the Related Art

The development of line sensor reading devices including charged-coupled devices (CCDs) and writing devices that use laser beams for writing has resulted in the development of digital copiers from traditional analog copiers.

Besides copying, a typical digital copier is equipped with various other functions such as scanning, printing, and facsimile. Hence, the digital copier is sometimes referred to as a digital multifunction product (MFP).

By connecting the MFP to a network, image data that is stored in the storage device, such as a hard disk drive (HDD), of an MFP can be transmitted to various other devices such as copiers, facsimile devices, and personal computers (PC) through the network. Because of the versatility of MFPs, the MFPs are being used in offices in a diversified manner.

For example, a small-sized MFP can be installed alongside a PC on a working desk to enjoy from the PC the functions of copying, facsimile, printing, and scanning available on the MFP. A middle-sized MFP can be shared by two or more departments or sections of an office. Such a use makes it possible to achieve a certain degree of productivity along with the use of functions like sorting, punching, and stapling provided in middle-sized MFPs. A large-sized multifunction MFP with high productivity and high quality can be used in departments where copying amounts to a large part of business, or in organizations that mainly deal with the business associated with copying.

Thus, an MFP of an appropriate class (size and functions) can be used depending on the use of the MFP. While all MFPs have some common functions, there are certain class-dependent functions. For example, large-sized MFPs have functions such as punching, stapling, and folding and electronic filing along with usual copying function. Small-sized MFPs often have enhanced Internet-FAX or PC-FAX services, and to perform high-quality image printing on dedicated paper for personal use.

On the other hand, along with the development of networking, there has been a desire that MFPs perform distributed processing through the network and share data between each other. For example, to print a large amount of data, there is a desire to distribute the data among some or all of the MFPs connected through the network to reduce the overall printing time.

The conventional systems that were built and sold prior to such diversified MFPs have a fixed set of functions necessary for each particular class only. As the importance of information values in business has been already recognized, the need is to not only transmit fast, accurate, and reliable information, but also to transmit it in an easy-to-understand and effective manner. Speed-up and diffusion of communication technology, development of large-capacity, low-cost, and small-sized memory devices, and enhancement in the performance of PCs have all resulted in providing a new function that efficiently handles information having digital data. Accordingly, MFPs handling digital image data are also required to provide and integrate new functions.

In the meantime, a document to be copied or scanned has various characteristics. In the conventional technology disclosed for example in Japanese Patent Applications Laid-open No. H9-134438 and H10-42130), the characteristic part of an image data of a document is extracted, and filter processing, color correction processing, and halftone processing are performed on the image data based on the extracted characteristic part.

According to another conventional technology disclosed for example in Japanese Patent Applications Laid-open No. 2001-223828, scanned image data and a unique signal that indicates the characteristic area of the scanned image data are stored in the HDD, and an appropriate image processing is performed depending on the output application.

However, in the conventional image processing apparatuses, the scanned image data reflects the features of the scanner itself. Hence, to share the data with other apparatuses, it is necessary, for example, to transmit to an image processing apparatus the features, i.e., the profile of the scanner.

It is common to perform irreversible compression, such as JPEG, when storing image data. When a document is a dot image, however, the compression ratio is poor, which results in unintended moire interference, thereby degrading the image quality. Moreover, sometimes noise or blank data, which is unrecognizable by the viewer, occur in image data read by a reading device. The noise or the blank data is another cause for poor compression ratio, which in turn leads to degraded image quality.

SUMMARY OF THE INVENTION

It is an object of the present invention to at least partially solve the problems in the conventional technology.

According to an aspect of the present invention, an image processing apparatus includes a determining unit that extracts similar-characteristic areas in image data that are areas that contain image data with substantially similar characteristics, and determines a type of the characteristics of image data of each of the similar-characteristic areas; a first correcting unit that corrects a characteristic of image data in each of the similar-characteristic areas to a predetermined data characteristic according to the type of the characteristics of image data of that similar-characteristic area thereby obtaining characteristics-corrected image data; a storage unit that stores therein the image data and the characteristics-corrected image data, wherein area information that indicates the similar-characteristic area that corresponds to each of the characteristics-corrected image data is stored in associated manner with the characteristics-corrected image data; a second correcting unit that corrects a characteristic of the image data and the characteristics-corrected image data stored in the storage unit to a destination-specific characteristic that corresponds to a destination to which image data is to be output; and an output unit that outputs the image data having the destination-specific characteristic to the destination.

According to another aspect of the present invention, a method of processing images includes extracting similar-characteristic areas in image data that are areas that contain image data with substantially similar characteristics; determining a type of the characteristics of image data of each of the similar-characteristic areas; correcting a characteristic of image data in each of the similar-characteristic areas to a predetermined data characteristic according to the type of the characteristics of image data of that similar-characteristic area thereby obtaining characteristics-corrected image data; storing the image data and the characteristics-corrected image data in a storage unit, wherein area information that indicates the similar-characteristic area that corresponds to each of the characteristics-corrected image data is stored in associated manner with the characteristics-corrected image data in the storage unit; correcting a characteristic of the image data and the characteristics-corrected image data stored in the storage unit to a destination-specific characteristic that corresponds to a destination to which image data is to be output; and outputting the image data having the destination-specific characteristic to the destination.

According to still another aspect of the present invention, a computer program product stores therein a computer program that causes a computer to implement the above method.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
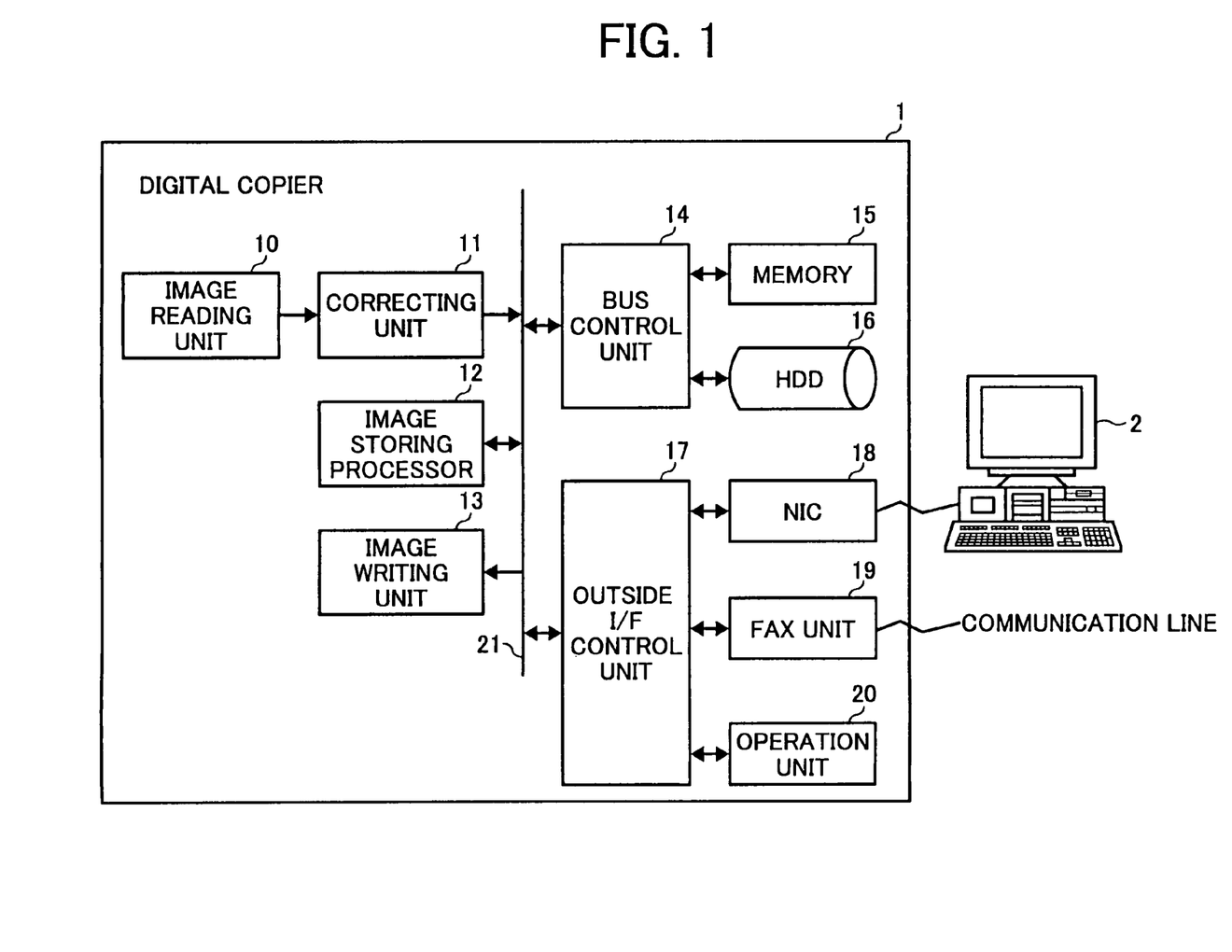
FIG. 1 is a block diagram of a digital copier according to an embodiment of the present invention.
Figure 2:
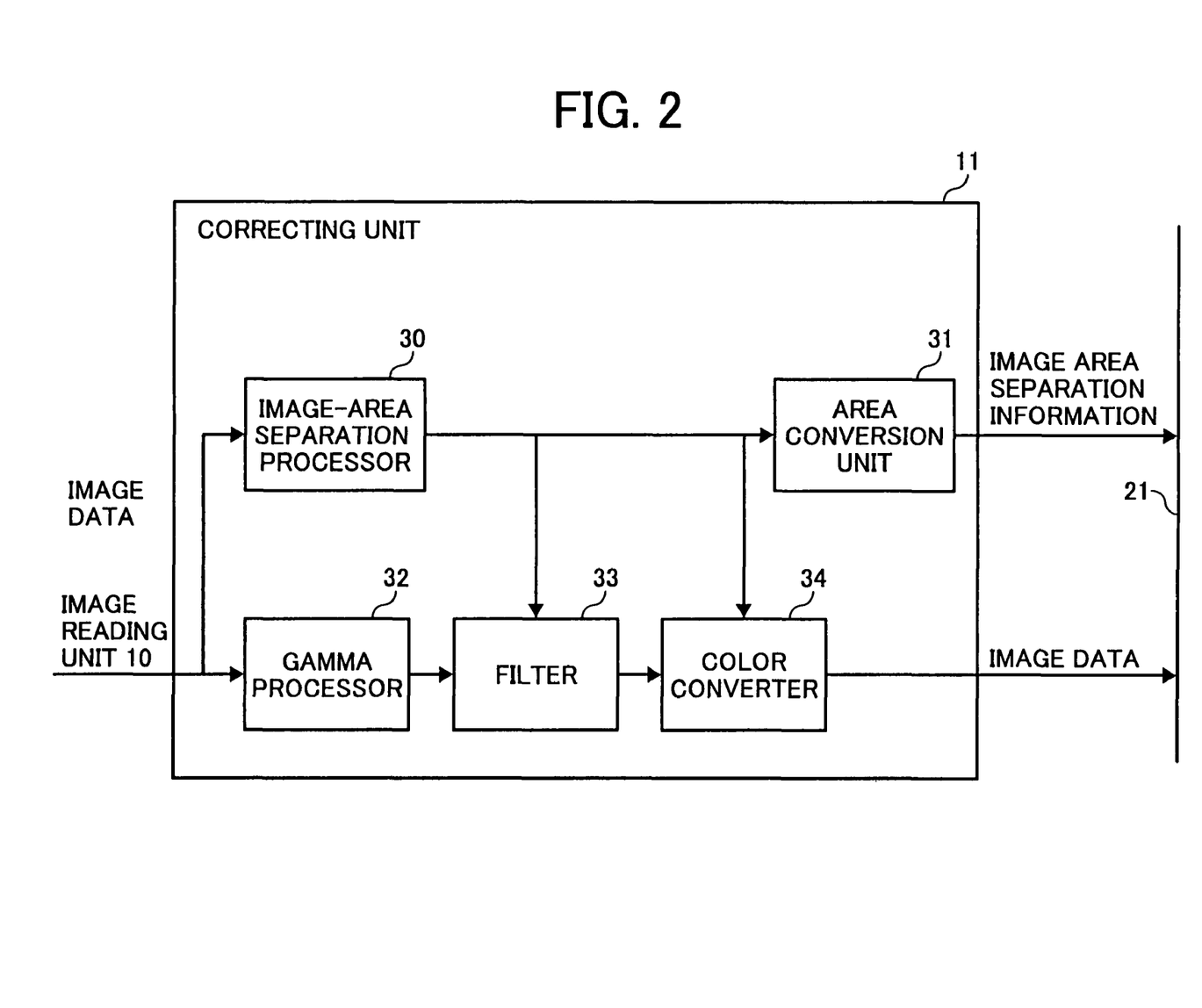
FIG. 2 is a block diagram of a correcting unit shown in FIG. 1.
Figure 3:
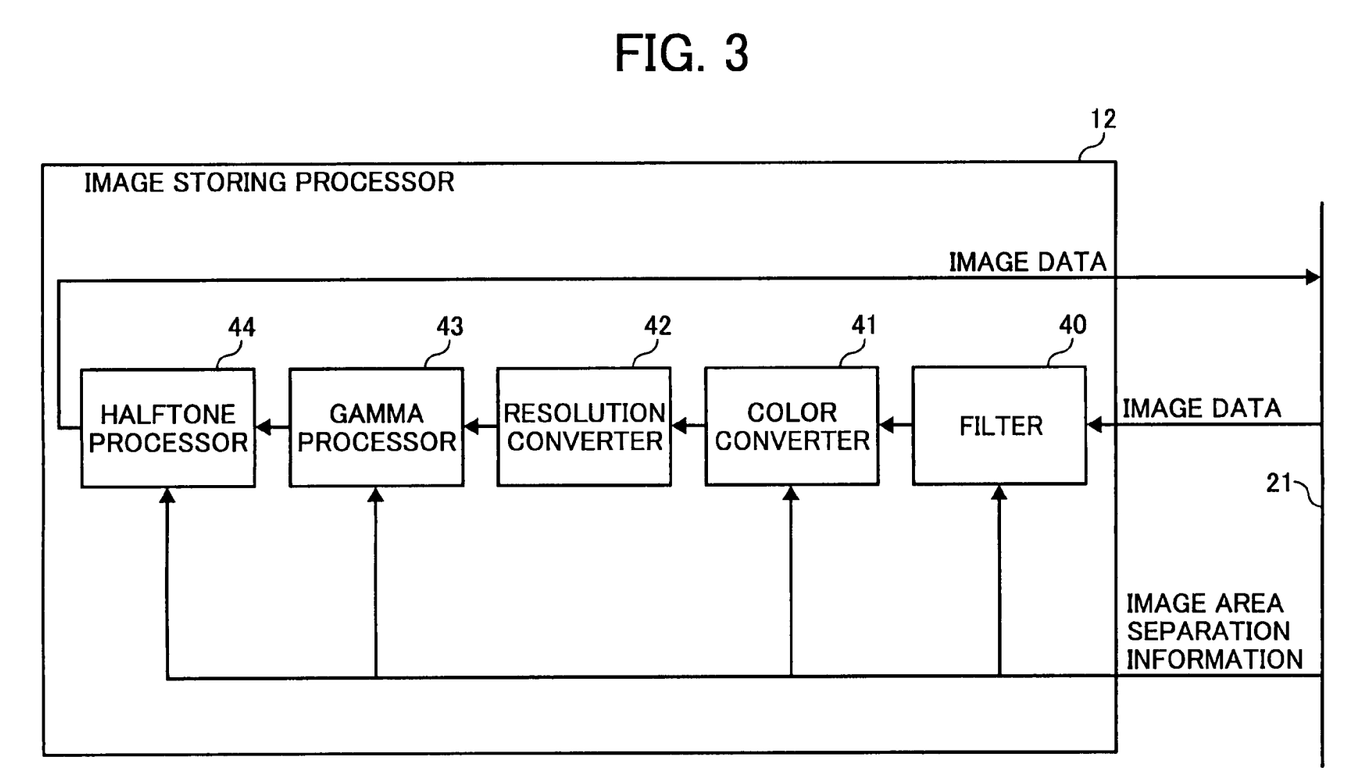
FIG. 3 is a block diagram of an image storing processor shown in FIG. 1.
Figure 4:
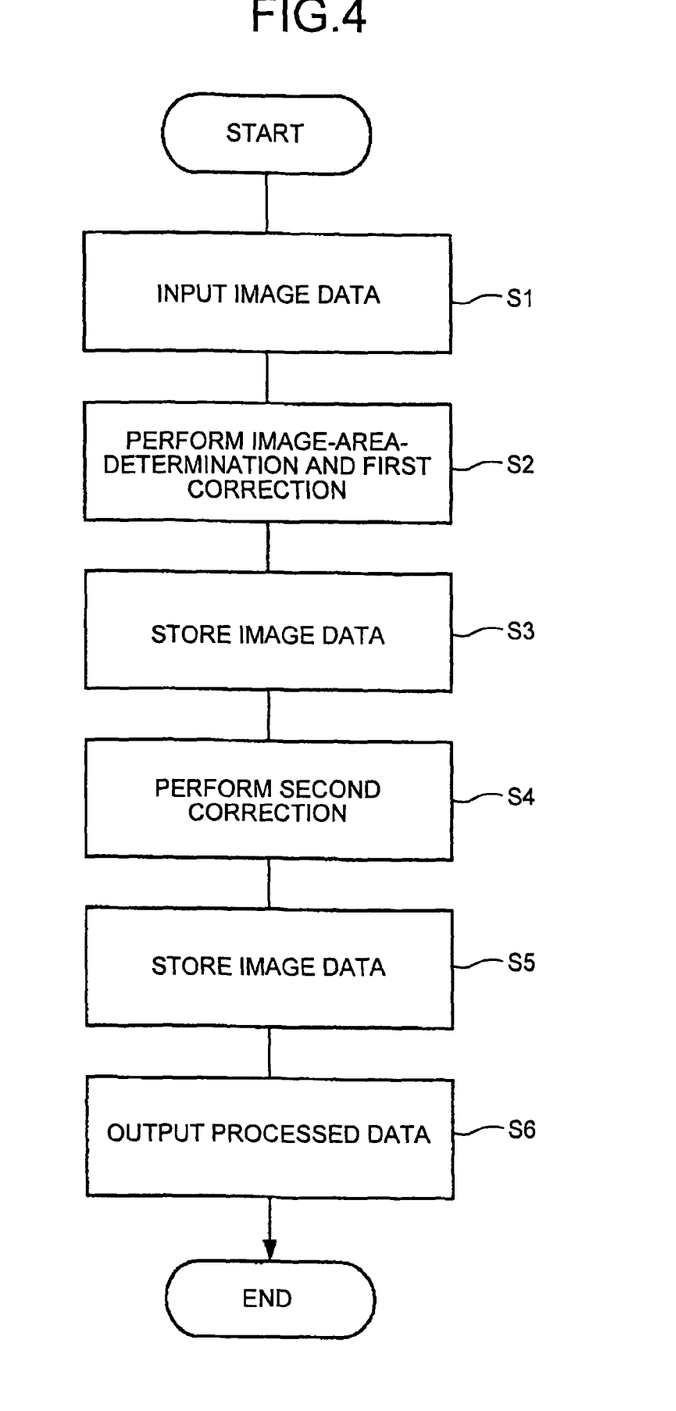
FIG. 4 is a flowchart of a process performed by the digital copier shown in FIG. 1.

FIG. 1 is a block diagram of a digital copier 1 according to an embodiment of the present invention. FIG. 2 is a block diagram of a correcting unit shown in FIG. 1. FIG. 3 is a block diagram of an image storing processor shown in FIG. 1. FIG. 4 is a flowchart of a process performed by the digital copier shown in FIG. 1.

The digital copier 1 is an image processing apparatus that includes each of later-described units implemented by a control unit of a microcomputer that includes a central processing unit (CPU), a read only memory (ROM), and a random access memory (RAM), and includes a copier, a facsimile device, and a scanner that carry out various processing of image data, thereby being referred to as a multifunction product (MFP).

A computer program that implements an image area determination procedure, a first correction procedure, a storage procedure, a second correction procedure, and an output procedure is installed in the control unit. An image processing method is carried out by executing the computer program. In other words, by executing the computer program, functions of each of later-described units can be realized.

The structure and processes performed by the digital copier 1 are explained in detailed below.

The digital copier 1 includes an image reading unit 10 such as a scanner. The image reading unit 10 includes a line sensor (not shown), an A/D converter (not shown), and driving circuits (not shown) for driving the line sensor and the A/D converter. The line sensor includes one or more CCD photoelectric conversion elements, and it irradiates a document with light and converts the reflected light to image signals. The A/D converter converts the image signals to digital image data. The grayscale information of the scanned document is indicated by an 8-bit RGB (input processing of image data in step S1 in FIG. 4) in the digital image data. The digital image data is transmitted to a correcting unit 11.

FIG. 2 is block diagram of the correcting unit 11. The correcting unit 11 includes an image-area separation processor 30. The image-area separation processor 30 receives the digital image data and extracts the characteristic areas of the image.

The image-area separation processor 30 extracts, for example, dots in the image and edges of characters are extracted. Moreover, the image-area separation processor 30 determines which portion of the image data is chromatic and which portion is achromatic, and determines whether the background is white. That is, the image-area separation processor 30 functions as an image area determining unit that extracts areas of identical image characteristics and determines their type.

The correcting unit 11 includes a gamma processor 32. The gamma processor 32 also receives the digital image data and performs gamma-conversion on the digital image data. In other words, the gamma processor 32 converts the gamma-characteristics of the digital image data from those of the image reading unit 10 to those for output.

The correcting unit 11 includes a filter 33. The filter 33 receives the gamma-conversion-subjected digital image data and converts the space frequency characteristics of image data. Moreover, the filter 33 performs filtering a specific process on each of the extracted areas based on the image area determination performed by the image-area separation processor 30.

The filter 33, for example, smooths the portions in an image having dots on them. When edges are found against a white background, the portion is considered as having characters, and the filter 33 performs an edge emphasizing process to improve modulation transfer function (MTF) characteristics.

The correcting unit 11 includes a color converter 34. The color converter 34 converts the colors matching to the output characteristic of the filtered image data based on the image area determination performed by the image-area separation processor 30.

Thus, the correcting unit 11 performs processing, i.e., first correction processing, to correct data characteristics of the digital image data to predetermined data characteristics based on the type of the determined area.

Moreover, because the image data has to be temporarily stored in the digital copier 1, it is converted to general RGB data or to RGB data in a predetermined space.

On the other hand, image area separation information (hereinafter "area information") that represents the area extracted by the image-area separation processor 30 is generated in an area conversion unit 31.

The image data that is output from the correcting unit 11 through a bus control unit 14 and the area information are associated with each other, and is stored in a memory 15 and also temporarily stored in an HDD 16 (storing of image data in step S3 in FIG. 4). In other words, the bus control unit 14 associates the image data corrected by the first correcting unit with the area information that represents the area extracted by the image area determining unit, and stores both the data in the memory 15 and the HDD 16.

The reason for temporarily storing the image data in the HDD 16 is as follows. Ideally, it is desirable to keep transmitting the image data to an image writing unit 13, which includes a plotter, simultaneously while the image reading unit 10 is reading images. However, when preparing for output, it is sometimes impossible to both input and output the image data, eventually exceeding the capacity of the memory 15.

No problem arises if the capacity of the memory 15 is large enough. A memory of large capacity increases the hardware cost. Such increase in the cost has been suppressed by temporarily storing the image data in the HDD 16, which is a large-capacity device. Moreover, image data can be stored in an HDD for a longer time than a simple memory.

The image data can be stored in its original form in the HDD 16 or in the memory 15. Alternatively, the image data can be compressed with a predetermined compressing process and then stored in the HDD 16 or in the memory 15. Compression makes it possible to use the memory area efficiently.

The image data may be compressed by reversible compression into multilevel images or irreversible compression with a suitable compression ratio. A known technology, such as JPEG compression, can be used to compress image data.

However, because status of the area is added for each pixel with regard to an area signal, it may errantly detect that the image data is deteriorated. Therefore, the reversible compression is preferable. A known technology, such as K8 or MMR, can be used to perform the reversible compression.

As an example of including the compression function, it is suitable to have a compressor arranged at the final stage inside the correcting unit 11 (behind the area conversion unit 31 and the color converter 34) and an expander arranged at the front stage of an image storing processor 12 (ahead of a later-described filter 40), or the compressor and the expander, omitted in the drawing, can be considered as separate functions in the bus control unit 14 to carry out compression and expansion on the data in the bus control unit 14.

After temporarily storing the image data and the area information in the HDD 16, it is transmitted from the memory 15 to the image storing processor 12 through the bus control unit 14.

The stored image data characteristics are converted to image printing characteristics in the image storing processor 12, an example being the conversion of color printing device data to CMYK data.

Data transmitted to the image storing processor 12 includes the image data and the area information. First, the image data is filtered in the filter 40 shown in FIG. 3 to match with the MTF characteristics of the image writing unit 13.

While the filter 33 in the correcting unit 11 corrects the image data to predetermined data characteristics to store it in the memory 15 or in the HDD 16, the filter 40 in the image storing processor 12 converts the predetermined stored image characteristics to the image characteristics of the image writing unit 13.

For example, each image in the characteristic area of the document image indicated by the area information is characteristically converted by using the area signal that represents whether the area is a character area. The image data filtered in the filter 40 is transmitted to a color converter 41.

Based on the area information in the color converter 41, the images in the area determined to be made up of black characters are converted to CMYK by using black-and-white processing. The image data processed in the color converter 41 is transmitted to a resolution converter 42.

In the resolution converter 42, a variable power process is optionally performed on the image data, which is then transmitted to a gamma processor 43.

In the gamma processor 43, gamma conversion from a predetermined image storing characteristic to an output characteristic is performed to the image data based on area information and the image data is transmitted to a halftone processor 44.

In the halftone processor 44, the image data that has been subjected to the gamma conversion is used and gradation processing to match a characteristic of the image writing unit 13 is given thereto based on area information. For example, the halftone processor 44 performs dither processing or error diffusion processing. Moreover, the halftone processor 44 performs density conversion (the number of bits) of gradation in the image writing unit 13. For example, if image data is output based on 2-bits, conversion to 2-bit signals is performed to 8-bit input signals while performing dither processing.

This is a second correction processing of image data performed at step S4 shown in FIG. 4.

In other words, the image storing processor 12 that performs the second correction processing performs a function, as a second correcting unit, of correcting a characteristic of image data stored in the storage unit to a data characteristic based on a designated destination to which data is output and correcting a characteristic of image data in an area represented by area information that corresponds to the image data to a data characteristic based on a destination to which data is output.

Thus, signals processed in the image storing processor 12 are stored in the memory 15 and the HDD 16 once (processing of storing image data at step S5 in FIG. 4) and are input in the image writing unit 13. When the image writing unit 13 receives digital image data that includes CMYK, the image writing unit 13 employs an electrophotographic process that uses laser beams and prints out images based on image data received on a transfer paper (processing of outputting image data at step S6 in FIG. 4).

In other words, the image writing unit 13 that performs output processing performs a function, as an output unit, of outputting image data corrected by the second correcting unit to a destination to which image data is output.

Image data is input and output respectively through a data bus 21 to forward it on the order of the image reading unit 10, the correcting unit 11, the image storing processor 12, and the image writing unit 13.

Then, when the image writing unit 13 tries to output image data processed by the image storing processor 12 based on timing on which they are controlled, for example, the image writing unit 13 is not sometimes ready to output it as paper, depending on a condition of engine plotter. At that time, image data is stored in the HDD 16 once.

The data bus 21 is shared by each module of the correcting unit 11, the image storing processor 12, the image writing unit 13, the memory 15, and the HDD 16 and is controlled by the bus control unit 14 that controls input and output of image data.

The memory 15, which can be a RAM, and the HDD 16 are also connected to the bus control unit 14.

In fact, image data is read by a line scanner in the image reading unit 10 and is transmitted to the image storing processor 12. For example, while image data is read by the image reading unit 10 and the image storing processor 12 performs another processing, image data including transfer speed and processing at that time is maintained in the memory 15.

Then, image data is stored in the HDD 16 as needed and the image data is reused.

In the above processing, an explanation is given about the case in which the original document included only text. However, the original document can include images.

Image data of a document is input in the image reading unit 10 and is converted to image data irrespective of device in the correcting unit 11 as a target of reusing image data.

As a characteristic of the image data irrespective of device, if it is a color space, for example, it is sYCC, an AdobeRGB space, or a predetermined RGB space that is a standard color space. A space frequency is determined in the same manner.

Then, image data is transmitted through the data bus 21, the bus control unit 14, and the memory 15 to store it in the HDD 16.

The image data stored in the HDD 16 is forwarded through the memory 15 and the bus control unit 14 to the image storing processor 12.

In the image storing processor 12, image processing is converted to match a characteristic of the image writing unit 13 from a characteristic irrespective of device because outputting paper is a target.

Then, images are output as paper based on image data by the image writing unit 13 after they are stored in the memory 15 once.

This processing is basically the same as the above image processing. What is different is whether the processing is performed until image data is stored, from reading an image until outputting it as paper, or until outputting stored image data as paper.

When outputting image data outside that is read by the image reading unit 10, the image data is sent to a PC 2 including a personal computer connected through a network.

RGB data, which is image data of 300 dpi, is sent as processing when sending the image data to the PC 2.

Basic processing is the same as processing described above. Particularly, processing from reading images of a document until storing image data is the same as processing described above and the explanation is omitted.

Later, when performing processing to image data stored in the HDD 16 in the image storing processor 12, the processing is performed to match a characteristic of a display based on a character area or the rest area other than that in the filter 40.

In the color converter 41, only an area of black characters is corrected to be R=G=B and the rest area other than that is converted to match a characteristic of a display, for example, to be an sRGB space.

Then, in the resolution converter 42, for example, when an input image is 600 dpi, it is converted to 300 dpi.

Afterward, processing is not performed in the gamma processor 43 and in the halftone processor 44. The processed image data is then stored in the memory 15 and it is converted to an image format type designated by a user through an operation unit 20. For example, after converting image data based on a compression type that includes JPEG or TIFF, it is sent through an outside I/F control unit 17 and a network interface card (NIC) 18 to the external PC 2.

When the image data is sent to an outside facsimile device, the image data stored in the memory 15 is sent through a fax unit 19 to a facsimile device that has a destination input through the operation unit 20.

As described above, extraction of dot portions in an image formed through typical printing, extraction of edge portions of characters, determination of whether image data is chromatic or achromatic, and determination of whether a landscape image is white are performed in the image-area separation processor 30.

In this case, the results based on the determinations are produced to each area as data. The data is 4 bits per pixel.

However, two of area information that is needed for processing in the image storing processor 12 is whether it is black characters or whether it is characters. As a result, it can be a 2-bit area signal.

Thus, processing is previously performed area by area in the correcting unit 11 so that only area information (an image area separation signal) that is area information needed in the image storing processor 12 can be stored. As a result, it is possible to reduce a memory area when storing area information.

In the correcting unit 11, filter processing is performed to dot portions, character portions, and an area other than those of read image data.

Smoothing processing is performed to dot portions to make a dot image that is characteristic to a document image uniform.

Therefore, the dot area is taken as an area that has the same characteristic as the other area, though it is not all the same, and processing is different based on whether the dot area is a character portion or an area other than the character portion in the image storing processor 12.

Characteristic processing is performed in each of the filter 40, the gamma processor 43, and the halftone processor 44. For example, some emphasis is put on a character portion through filter processing to make an image sharp and clear and an image is formed through halftone processing based on a pattern that has a larger number of lines or error diffusion. In addition, filter processing is performed to an area without characters to make the area smoothly displayed and an area is formed through halftone processing based on a dither pattern that has a smaller number of lines.

Thus, characteristic image processing is performed with respect to paper on which an image is printed in response to a characteristic for each area.

In this case, when image data is monochrome data, it is unnecessary to indicate a color area in particular.

It is unnecessary to determine whether an area is black characters in the image-area separation processor 30, for example, and to store unnecessary area information, thereby saving a memory capacity.

When printing image data stored in the HDD 16 on paper, the image data, which may be read from a color document is converted from RGB to CMYK in the color converter 41.

Then, with regard to an area of a document image in which a black image is formed, for example, when the area has a black portion of the hair on the head that is often shown on a photograph and a black character portion, the former area is not made simple black, which can be suitably constituted of K+CMY. On the other hand, it is good that the black character portion can be constituted of only K.

This is because bleeding can not be recognized by use of a single color rather than four colors and the area becomes sharper as a character.

Therefore, area information of a black character portion is required in the image storing processor 12.

Moreover, when image data is delivered to an outside device that includes the PC 2, image data read by the image reading unit 10 has an imbalanced ratio among R, G, and B with respect to a black portion. Therefore, color conversion processing is performed to be R=G=B for viewing an image based on image data on the PC 2.

Based on such processing, when viewing an image on a display device (not shown) that includes a display and when outputting an image as printed paper through the image writing unit 13 again after receiving image data on the PC 2, black processing is performed to an image, thereby increasing sharpness in black characters.

Area information has three areas of a black character, a character other than the black character (a colored character), and the rest other than them.

They are divided to decode as follows:
whether it is a character area; and
whether it is achromatic (chromatic).

Based on the results, it is possible to determine an achromatic area that includes black characters and a character area, a chromatic area that includes colored characters and a character area, and an area other than them.

If each of them can be recognized, each of them can be detected.

A combination of kinds determined above and usage thereof are used depending on their purposes. As long as they are used in an area that is formed based on 2-bits, an amount of memory used when they are stored is not increased.

Only an area of area information can be formed as an image without any problem because processing has been already performed to a dot area.

In the above processing, a dot image is not needed in the image storing processor 12.

In other words, when an image that has the same characteristic is a dot image in the image storing processor 12, a characteristic of image data in an area indicated by area information that corresponds to image data is not corrected.

That is because processing has been already performed to a dot image in the filter 33 of the correcting unit 11.

The reason why processing is not performed to the dot image in the image storing processor 12 is that when storing based on irreversible compression, for example, when compressing based on a JPEG type that is a kind of irreversible compression, a remaining dot area in an image causes large degradation in a compression ratio.

An irreversible compression type is not suitable for an image such as a dot image in which unevenness of an image continuously changes. Extended data may be also deteriorated.

Therefore, when image data is read particularly through a color CCD, when color shift occurs in a dot image to read each of R, G, and B in the image reading unit 10, if a status of color shift is kept as it is, which causes color change.

To correct it, smoothing processing is performed to the dot image, thereby reducing image degradation in color conversion.

However, when a dot image is compressed once based on a JPEG type without performing smoothing processing and color conversion is performed after it is extended, because a dot image is originally hard to be decompressed based on a JPEG type, the dot image can not avoid being degraded even if it receives smoothing processing later.

Therefore, it is necessary to perform processing to a dot image before storing it and it is unnecessary to store area information that indicates an area in which a dot image is extracted.

The digital copier 1 detects a characteristic area of a document with respect to image data after the document is read and performs image processing for each area. After image data is stored once, processing in response to output applications is performed to image data. A characteristic area needed at this time is also selected to perform processing. Only data needed at that time is stored in the area data, leading to reduction of image data and an amount of area information when storing data. As a result, it is possible to save a capacity of memory in a storage device in which image data is stored.

Processing is performed area by area before storing, thereby causing an efficient compression ratio and reduction and efficient utilization of a memory area.

Moreover, with regard to a dot image in an area, it is unnecessary to store area information of the dot image with respect to stored image data by converting a characteristic of the image before storing it to make it similar to an image in another area, thereby leading to reduction of a memory capacity when storing and prevention of image degradation when storing image data.

Processing that employs area information is performed to image data before storing it in the image processing apparatus and the image processing method according to an aspect of the present invention. An area that is needed after storing image data is generated again and is stored with image data stored before. Therefore, image processing that is suitable for an output application can be performed by using the stored image data.

A program according to an aspect of the present invention makes it possible for a computer to implement a function to perform image processing that is suitable for an output application by using image data.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   a determining unit that extracts similar-characteristic areas in image data that are areas that contain image data with substantially similar characteristics, and determines a type of the characteristics of image data of each of the similar-characteristic areas;
   a first correcting unit that corrects a characteristic of image data in each of the similar-characteristic areas to a predetermined data characteristic according to the type of the characteristics of image data of that similar-characteristic area thereby obtaining characteristics-corrected image data;
   a storage unit that stores the characteristics-corrected image data and associated area information, the area information representing the extracted similar-characteristic area that corresponds to each of the characteristics-corrected image data;
   a second correcting unit that corrects a characteristic of the characteristics-corrected image data stored in the storage unit based on the area information to a destination-specific characteristic that corresponds to a destination to which image data is to be output, wherein if the characteristics-corrected image data corresponds to dot images, the second correcting unit does not correct the characteristic of the characteristics-corrected image data; and
   an output unit that outputs the image data having the destination-specific characteristic to the destination.

2. The image processing apparatus according to claim 1, wherein the similar-characteristic areas are areas that contain text characters.

3. The image processing apparatus according to claim 2, wherein the determination of a type of the characteristics of image data includes determining whether the text characters are black.

4. The image processing apparatus according to claim 1, wherein the determination of a type of the characteristics of image data includes determining whether the image data is chromatic or achromatic.

5. The image processing apparatus according to claim 1, wherein the determination of a type of the characteristics of image data includes determining whether the image data corresponds to black text characters, colored characters, chromatic without characters, or achromatic without characters.

6. A method of processing images performed by an image processing apparatus that includes a determining unit, a first correcting unit, a storage unit, a second correcting unit, and an output unit, the method comprising:
- extracting, by the determining unit, similar-characteristic areas in image data that are areas that contain image data with substantially similar characteristics and determining, by the determining unit, a type of the characteristics of image data of each of the similar-characteristic areas;
- correcting, by the first correcting unit, a characteristic of image data in each of the similar-characteristic areas to a predetermined data characteristic according to the type of the characteristics of image data of that similar-characteristic area thereby obtaining characteristics-corrected image data;
- storing, by the storage unit, the characteristics-corrected image data and associated area information, the area information representing the extracted similar-characteristic area that corresponds to each of the characteristics-corrected image data;
- correcting, by the second correcting unit, a characteristic of the characteristics-corrected image data stored in the storage unit based on the area information to a destination-specific characteristic that corresponds to a destination to which image data is to be output, wherein if the characteristics-corrected image data corresponds to dot images, the characteristic of the characteristics-corrected image data is not corrected; and
- outputting, by the output unit, the image data having the destination-specific characteristic to the destination.

7. The method according to claim 6, wherein the similar-characteristic areas are areas that contain text characters.

8. The method according to claim 7, wherein the determination of a type of the characteristics of image data includes determining whether the text characters are black.

9. The method according to claim 6, wherein the determination of a type of the characteristics of image data includes determining whether the image data is chromatic or achromatic.

10. The method according to claim 6, wherein the determination of a type of the characteristics of image data includes determining whether the image data corresponds to black text characters, colored characters, chromatic without characters, or achromatic without characters.

11. A computer program product including a non-transitory computer-readable medium having computer-readable program codes for processing an image performed by an image processing apparatus that includes a determining unit, a first correcting unit, a storage unit, a second correcting unit, and an output unit, the program codes when executed causing the image processing apparatus to execute:
- extracting, by the determining unit, similar-characteristic areas in image data that are areas that contain image data with substantially similar characteristics and
- determining, by the determining unit, a type of the characteristics of image data of each of the similar-characteristic areas;
- correcting, by a first correcting unit, a characteristic of image data in each of the similar-characteristic areas to a predetermined data characteristic according to the type of the characteristics of image data of that similar-characteristic area thereby obtaining characteristics-corrected image data;
- storing, by the storage unit, the characteristics-corrected image data and associated area information, the area information representing the extracted similar-characteristic area that corresponds to each of the characteristics-corrected image data;
- correcting, by the second correcting unit, a characteristic of the characteristics-corrected image data stored in the storage unit based on the area information to a destination-specific characteristic that corresponds to a destination to which image data is to be output, wherein if the characteristics-corrected image data corresponds to dot image, the characteristic of the characteristics-corrected image data is not corrected; and
- outputting, by the output unit, the image data having the destination-specific characteristic to the destination.

12. The computer program product according to claim 11, wherein the similar-characteristic areas are areas that contain text characters.

13. The computer program product according to claim 12, wherein the determination of a type of the characteristics of image data includes determining whether the text characters are black.

14. The computer program product according to claim 11, wherein the determination of a type of the characteristics of image data includes determining whether the image data is chromatic or achromatic.

15. The computer program product according to claim 11, wherein the determination of a type of the characteristics of image data includes determining whether the image data corresponds to black text characters, colored characters, chromatic without characters, or achromatic without characters.

* * * * *